United States Patent

Owens et al.

[11] Patent Number: 5,555,416
[45] Date of Patent: Sep. 10, 1996

[54] AUTOMATED SOFTWARE INSTALLATION AND OPERATING ENVIRONMENT CONFIGURATION FOR A COMPUTER SYSTEM BASED ON CLASSIFICATION RULES

[75] Inventors: Gary L. Owens, Mountain View; David Labuda, Half Moon Bay, both of Calif.

[73] Assignee: Sun Microsystems, Inc., Mountain View, Calif.

[21] Appl. No.: 291,330

[22] Filed: Aug. 17, 1994

Related U.S. Application Data

[63] Continuation of Ser. No. 949,041, Sep. 22, 1992.

[51] Int. Cl.[6] .................................................. G06F 9/44
[52] U.S. Cl. .................................. 395/700; 364/DIG. 1; 364/280; 364/280.2
[58] Field of Search .................................. 395/650, 700; 364/DIG. 1/2

[56] References Cited

U.S. PATENT DOCUMENTS

| | | | |
|---|---|---|---|
| 4,117,974 | 10/1978 | Ciaramella | 235/304 |
| 4,654,783 | 3/1987 | Veres et al. | 364/200 |
| 4,720,812 | 1/1988 | Kao et al. | 364/900 |
| 5,142,680 | 8/1992 | Ottman et al. | 395/700 |
| 5,247,683 | 9/1993 | Holmes et al. | 395/700 |

FOREIGN PATENT DOCUMENTS

| | | | |
|---|---|---|---|
| 8902501 | 10/1989 | Netherlands | G06F 9/445 |

OTHER PUBLICATIONS

"Device/Profile Installation Procedure with Validation," IBM Tech. Disclosure Bulletin, vol. 28 No. 4, Sep. 1985.
Swan, Tom, "Developer's Tool box: No–stall Install", PC World, Mar. 1991, vol. 9 No. 3 p. 259.
Summer Conf. Proc., Jun. 9, 1986, Usenix Assoc., El Cerrito, US, pp. 159–171, Daniel Nachbar "When Network File Systems Aren't Enough: Automatic Software Distribution Revisited".
Patent Abstracts of Japan, vol. 13, No. 397 (P–928) 5 Sep. 1989.
IBM Technical Disclosure Bulletin., vol. 28, No. 4, Sep. 1985, New York US, p. 1441 "Configuration file comprising configuration commands and data".
IBM Technical Disclosure Bulletin, vol. 32, No. 9A, Sep. 1990, New York US, pp. 407–408 "Initialization code executed after Post and before the operating system gets control".

*Primary Examiner*—Kevin A. Kriess
*Attorney, Agent, or Firm*—Blakely Sokoloff Taylor & Zafman

[57] ABSTRACT

A boot device, a local or remote install media, and a local or remote storage device are provided to a computer system. The boot device comprises an install media locator and starter module. The local or remote install media comprises an install set up and control module and an install module. The local or remote storage device comprises a defaulted or a customized collection of installation files. The defaulted/customized collection of install files comprise a classification rules file, a number of pre-install class class script files, a number of install class parameter files, and a number of post-install class script files. Together, these elements cooperate to automatically install software products on the computer system, and configure the operating environment of the computer system.

20 Claims, 12 Drawing Sheets

| PROBE FUNCTIONS | ENVIRONMENT VARIABLES | COMPARE FUNCTIONS |
|---|---|---|
| PROBE_HOSTNAME | SI_HOSTNAME | CMP_HOSTNAME |
| PROBE_HOSTADDRESS | SI_HOSTADDRESS | CMP_HOSTADDRESS |
| PROBE_NETWORK | SI_NETWORK | CMP_NETWORK |
| PROBE_DOMAINNAME | SI_DOMAINNAME | CMP_DOMAINNAME |
| PROBE_ROOTDISKSIZE | SI_ROOTDISKSIZE | CMP_ROOTDISKSIZE |
| PROBE_ARCH | SI_ARCH | CMP_ARCH |
| PROBE_KARCH | SI_KARCH | CMP_KARCH |
| PROBE_MODEL | SI_MODEL | CMP_MODEL |
| PROBE_MEMSIZE | SI_MEMSIZE | CMP_MEMSIZE |
| PROBE_USERCHOICE | SI_USERCHOICE | CMP_USERCHOICE |
| PROBE_HOSTID | SI_HOSTID | CMP_HOSTID |

*Figure 7*

CLASSIFICATION RULES FILE  36 OR 36'

```
# common: 2x104 disks
karch sun4c && disksize c0t3d0s0 40-107 && disksize c0t1d0s0 \
104a/      40-107 && numdisks 2 - class_2x104 finish_XXX common: 1x207 disks
karch sun4c && disksize c0t3d0s0 107-210 && numdisks 1 \
104b/      - class_1x207_t3 finish_XXX common: 1x104 & 1x207 disks
karch sun4c && disksize c0t3d0s0 40-107 && disksize c0t1d0s0 \
104c/      107-210 && numdisks 2 - class_104_207 finish_XXX

### OR, using derived profiles ######################

# common: 2x104 disks
disksize c0t3d0s0 40-107 && disksize c01d0s0 40-107 && \
104d/      numdisks 2 derive_class_2x104 = finish_XXX common: 1x207 disks
totaldisk 107-210 && numdisks 1 \
104e/      derive_class_1x207 = finish_XXX common: 1x104 & 1x207 disks
disksize c0t3d0s0 40-107 && disksize c0t1d0s0 107-210 && \
104f/      numdisks 2 derive_class_104_207 = finish_XXX
disksize c0t1d0s0 40-107 && disksize c0t3d0s0 107-210 && \
104g/      numdisks 2 derive_class_104_207 = finish_XXX
```

PRE-INSTALL CLASS SCRIPT FILE  38 OR 38'

```
###### functions #############
bailout () {
        echo ""
        echo "$1"
        echo ""
        echo "type <return> to continue"
        read ans
        exit 1
}

####### MAIN Main main ############# from SI DISKLIST, get the names of the disks
if [ ! "${SI_DISKLIST}" ] ; then
        bailout "${0} : SI_DISKLIST not set"
fi

ASSUME just two disks, could verify via SI_NUMDISKS first=`expr ${SI_DISKLIST} : '\(c[0-9]*t*[0-9]*d[0-9]*\),.*'`
second=`expr ${SI_DISKLIST} : 'c[0-9]*t*[0-9]*d[0-9]*,\(.*\),*'`
if [ ! ${first} ] ; then
        bailout "${myname} : cannot find first disk,
        SI_DISKLIST: ${SI_DISKLIST}"
fi
if [ ! ${second} ] ; then
        bailout "${myname} : cannot find 2nd disk,
        SI_DISKLIST: ${SI_DISKLIST}"
fi
if [ "${first}" = c0t3d0 ] ; then
     ROOT=${first}
     USR=${second}
elif [ "${second}" = c0t3d0 ] ; then
     ROOT=${second}
     USR=${first}
else
     ROOT=${first}
     USR=${second}
fi
cat << ZZZ >> ${PROFILE}
install_type   Initial_install
system_type    Standalone
filesys ${ROOT}s0 16 / ufs
filesys ${ROOT}s1 50- swap swap
filesys ${ROOT} s5 10- /opt ufs
filesys ${USR}s2 90- /usr ufs
cluster   SUNWCuser
ZZZ
``` continued in Figure 9b continued from Figure 9a

```
# add the localization packages to the profile

# This list could come from a file and/or be calculated some way,
# perhaps by looking at the keyboard type.
# In this example both the os and windows localizations are added
# for German (de) and French (fr)
lpkgs-`cat <<ZZZ
SUNWdeos
SUNWdeow
SUNWfros
SUNWfrow
ZZZ` for p in ${lpkgs} ; do
        echo "adding localization package: ${p}"      # for log
        echo "package ${p} add" >> ${PROFILE}
done
```

INSTALL CLASS PARAMETERS FILE             40 OR 40'

| | |
|---|---|
| INSTALL_TYPE | INITIAL_INSTALL |
| SYSTEM_TYPE | STANDALONE |
| FILESYS | /DEV/DSK/C0T3D0S0   16 / UFS |
| FILESYS | C0T3D0S1   33   SWAP   SWAP |
| FILESYS | /DEV/DSK/C0T3D0S6   40-   /USR   UFS |
| CLUSTER | SUNWCreq |
| CLUSTER | SUNWCadm |
| PACKAGE | SUNWesu |
| PACKAGE | SUNWhea |
| PACKAGE | SUNWinst |
| • | |
| • | |
| • | |

*Figure 10*

POST-INSTALL CLASS SCRIPT FILE  42 OR 42'

```
set -x

#################################################

# set vfstab additions

# everytime I reinstall, the path to the compilers changes!
DISTSERVER ="infidel-111"
CSERVER="infidel-111"

CPATH=`(cd/net/${CSERVER}/export/mars/sunpro ; /bin/ls | \
         read one rest ; echo $one )`

echo "DDD: CPATH is: ${CPATH}"

mkdir /a/usr/dist
mkdir /a/opt
mkdir /a/opt/SUNWSpro

cat <<XXX>> /a/etc/vfstab
${DISTSERVER} : /export/dist -        /usr/dist nfs - yes ro
${CSERVER} : /export/mars/sunpro/2.0.1/SUNWspro
             - /opt/SUNWSpro nfs - yes ro
${CSERVER} : /export/mars/openwinV3.1/alpha3.1 - /usr/openwin nfs
             - yes ro
XXX

#################################################

# add root password hands off

# use sed to chop off the "root" line of shadow
sed '/^root:/d' /a/etc/shadow > /tmp/t1
cat ${SI_CONFIG_DIR}/ .stuff/gs /tmp/t1 > /tmp/t2
mv /tmp/t2 /a/etc/shadow
chmod 400 /a/etc/shadow
rm /tmp/t1
# twiddle the sysIDtool.state file
sed ' / [rR]oot.*[pP]ass/s/0/1/p' /a/etc/.sysIDtool.state > /tmp/t3
mv /tmp/t3 /a/etc/ .sysIDtool.state echo "finished with finish"
```

AUTOMATED SOFTWARE INSTALLATION AND OPERATING ENVIRONMENT CONFIGURATION FOR A COMPUTER SYSTEM BASED ON CLASSIFICATION RULES

This is a continuation of application Ser. No. 07/949,041 filed on Sep. 22, 1992.

BACKGROUND OF THE INVENTION

1. Field of the Invention

The present invention relates to the field of computer systems, in particular, microprocessor based computer systems connected as a network. More specifically, the present invention relates to installing software products and configuring operating environments on these computer systems.

2. Background

As cost performance of microprocessor based computer systems and network technology continues to improve, their popularity continues to increase. However, before each of these powerful low cost computer systems can be put to productive use, typically a slate of software products including an operating system has to be installed on the computer system, and the operating environment has to be properly configured. Both the typical slate of software products that get installed and the number of operating environment configuration decisions that have to be made continue to grow with the power and capacity of these low cost computer systems. Increasingly, it is not uncommon to find organizations having to install a large number of software products and configure operating environments on tens, hundreds, or even thousands of machines, While the installed software and the operating environments are not uniform across all machines within the organization, they tend to be substantially similar within a class of machines, such as accounting's workstations or engineering's workstations.

One common solution to the problem is to have a typical slate of software products preinstalled and the operating environment pre-configured in a typical configuration at the factory. Experience has shown that this approach is satisfactory only to a minority number of users. The majority of users find themselves to be atypical and having to reinstall the software products and reconfigure the operating environment in order to meet their needs. Additionally, the approach is costly to the manufacturers. It forces earlier cutoff of software development. When changes to one or more of the software products are necessary, existing inventories in the distribution channels will have to be recalled, their software products reinstalled with the latest revisions, and their operating environments reconfigured taking into account the latest revisions. Furthermore, the factory preinstall approach really does not address the need of system administrators who have to install software products and configure operating environments of a class of similar machines.

Thus, it is desirable to automate software installation and operating environment configuration on computer systems, in particular, microprocessor based computer systems connected in a network. It is further desirable if automated software installation and operating environment configuration can overcome the manufacturing disadvantages of the factory pre-install approach. It is further desirable if the needs of system administrators who have to install software products and configure operating environments for classes of similar machines can be addressed. As will be disclosed, the method and apparatus of the present invention for automatically installing software products and configuring operating environment on a computer system achieves the above described desired results.

SUMMARY OF THE INVENTION

A method and apparatus for automatically installing software products and configuring operating environment on a computer system is disclosed. The method and apparatus of the present invention overcomes the disadvantages of the factory preinstall approach to software installation and operating environment configuration. The present invention allows system administrator to automatically install software products and configure operating environment by machine class. The present invention has particular application to microprocessor based computer systems connected in a network.

Under the present invention, a boot device, a local or remote install media and a local or remote storage device are provided to a computer system. The boot device comprises an install media locator and starter module. The local or remote install media comprises an install set up and control module and an install module. The local or remote storage device comprises a defaulted or a customized collection of installation files. The defaulted/customized collection of installation files comprises a classification rules file, a number of pre-install class script files, a number of install class parameters file, and a number of post-install class script files. Together, these elements cooperate to automatically install software products on the computer system, and configure the operating environment of the computer system.

The install media locator and starter module is loaded into the memory of the computer system and given control as part of the computer system's boot up process. The install media locator and starter module is used to locate a local or a remote media, and starts up the local/remote install set up and control module stored on the located local/remote media. The local/remote install set up and control module is used to determine at least a pre-install class, or an install class, or a post-install class for the computer system. The local/remote install set up and control module makes the class determinations based on the classification rules stored in the defaulted/customized classification rules file. Additionally, the local/remote install set up and control module is used to start the corresponding defaulted/customized pre-install class script file if a pre-install class is determined, the local/remote install module if an install class is determined, and the corresponding defaulted/customized post-install class script file if a post-install class is determined.

The defaulted/customized pre-install class script files are used to perform pre-installation tasks for the corresponding pre-install classes. The local/remote install module is used to install software products and configure the operating environment of the computer system based on the installation parameters stored in the corresponding defaulted/customized install class parameters file of the determined installation class. The defaulted/customized post-install class script files are used to perform post-installation tasks for the corresponding post-install classes.

As will be explained in detail below, pre-installation tasks can include such tasks as determining whether or not localization packages (i.e., system support packages for different countries) are required, setting up the required file systems, and any other tasks that need to be performed for the pre-installation class before other installation tasks are performed, as determined by the specific model of the computer, the type of applications that the computer will support, etc. Post-installation tasks include such tasks as restoring paths to certain applications and directories, restoring user preferences and any other tasks that are required to restore the computer system back to operational status. The determination of which classification each task is to be associated with (i.e. the determination of the order of the task execution) is dependent on the specific type of the computer system and the needs of the system administrator.

The use of the pre-install, install and post-install classifications provides flexibility in the installation process by allowing installation procedures to be broken down into separate scripts and the most common portions "re-used," without having to write a different script for each machine class. For example, all engineering workstations will require particular application or system software be installed. However, the localization requirements for each workstation might be different (e.g. some workstations might have to support French, others might have to support Dutch and German). By assigning all engineering workstation the same install class designation but different preinstall classifications, where each pre-install classification is determined by the language(s) that the workstation needs to support, each engineering workstation will support the appropriate language(s) when the local/remote install set up and control module executes the appropriate defaulted/customized pre-install class script file(s) and also have the required applications or systems software installed when the local/remote install set up and control module executes the appropriate local/remote install module.

Additionally, in the presently preferred embodiment, the defaulted/customized install class parameter file for an install class may be dynamically derived by a defaulted/customized pre-install class script file. The local/remote install set up and control module determines whether the defaulted/customized install class parameter file for an install class is to be dynamically derived or not, and the defaulted/customized pre-install class script file that will do the derivation, based on the rules in the defaulted/customized classification rules file. The local/remote install set up and control module also controls the naming of the derived install class parameters file.

BRIEF DESCRIPTION OF THE DRAWINGS

The objects, features, and advantages of the present invention will be apparent from the following detailed description of the presently preferred and alternate embodiments of the invention with references to the drawings in which:

FIG. 7 illustrates exemplary probe functions, corresponding environment variables and comparison functions for the local/remote install set up and control module of FIG. 6.

FIG. 8 illustrates an exemplary classification rules file of a local/remote collection of installation files.

FIGS. 9a-9b illustrate an exemplary pre-install class script file of a local/remote collection of installation files.

FIG. 10 illustrates an exemplary install class parameters file of a local/remote collection of installation files.

FIG. 11 illustrates an exemplary post-install class script file of a local/remote collection of installation files.

DETAILED DESCRIPTION PRESENTLY PREFERRED AND ALTERNATE EMBODIMENTS

A method and apparatus for automatically installing software products and configuring operating environment on a computer system is disclosed. The method and apparatus of the present invention overcomes the disadvantages of the factory preinstall approach to software installation and operating environment configuration. The present invention allows system administrator to automatically install software products and configure operating environment by machine class. The present invention has particular application to microprocessor based computer systems connected in a network. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
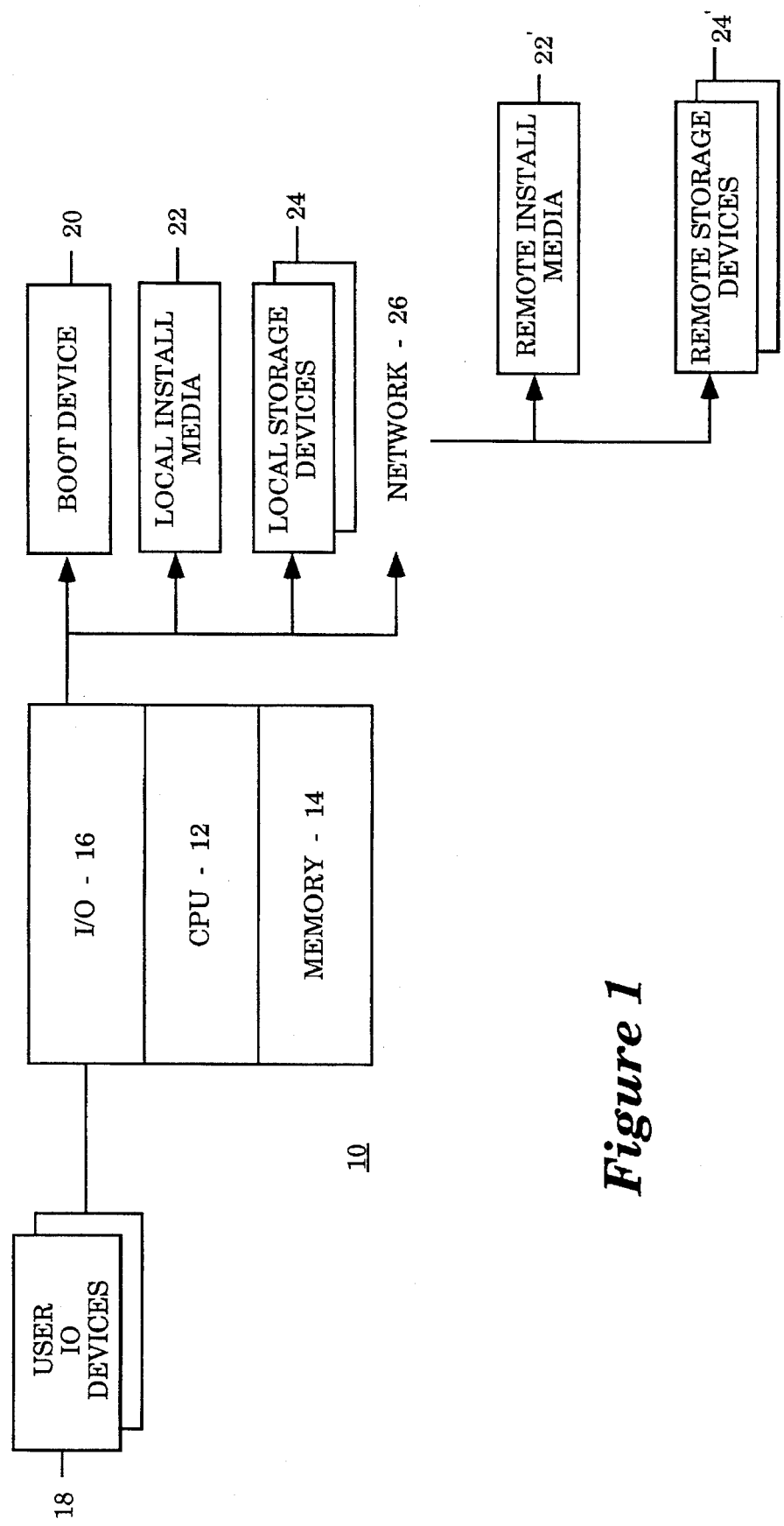
FIG. 1 illustrates an exemplary computer system incorporated with the teachings of the present invention.

Referring now to FIGS. 1, a block diagram illustrating an exemplary computer system incorporated with the teachings of the present invention is shown. Shown is an exemplary computer system 10 comprising a central processing unit (CPU) 12, a memory 14, and an I/O module 16. Additionally, the exemplary computer system 10 also comprises a number of user input/output devices 18, a boot device 20, a local install media 22, and a number of storage devices 24. The CPU 12 is coupled to the memory 14 and the I/O module 16. The user input/output devices 18, the boot device 20, the install media 22, and the storage devices 24 are also coupled to the I/O module 16. The I/O module 16 in turn is coupled to a network 26, through which a remote install media 22' and a number of remote storage devices 24' are accessible to the exemplary computer system 10.

Except for the manner they are used to practice the present invention, the CPU 12, the memory 14, the I/O module 16, the user input/output devices 18, the boot device 20, the local/remote install media, 22 and 22', the local/remote storage devices, 24 and 24', and the network 26, are intended to represent a broad category of these hardware elements found in most computer systems. The constitutions and basic functions of these elements are well known and will not be otherwise further described here. The contents of the boot device 20, the local/remote install media, 22 and 22', and the local/remote storage devices, 24 and 24', and the manner in which these contents cooperate with each other, will be described in further detail with references to the remaining figures.

While the present invention is being described with an exemplary computer system 10 having accesses to both local and remote install media, 22 and 22', as well as local and remote storage devices, 24 and 24', based on the descriptions to follow, it will be appreciated that the present invention may be practiced with the computer system having access to either local or remote install media, and, either local or remote storage devices.

Figure 2:
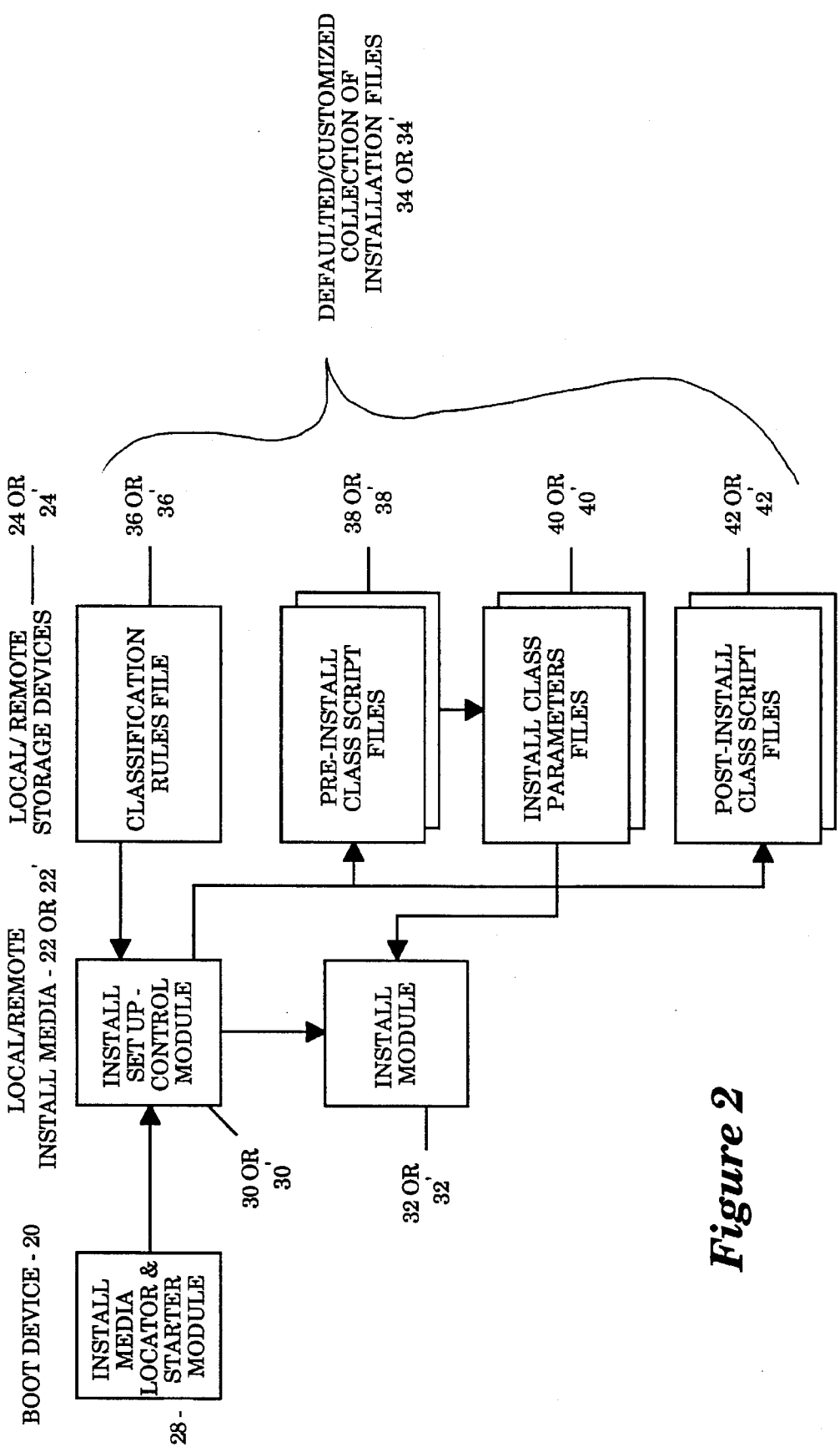
FIG. 2 illustrates the contents of the boot device, the local/remote install media, and the local/remote storage devices under the present invention.

Referring now to FIG. 2, a block diagram illustrating the content of the boot device, the local/remote install media, and the local/remote storage devices is shown. The boot device 20 comprises an install media locator and starter module 28. The local/remote install media, 22 or 22', comprises an install set up and control module, 30 or 30', and an install module, 32 or 32'. The local/remote storage devices, 24 or 24', comprise a collection of installation files, 34 or 34', including a classification rules file, 36 or 36', a number of pre-install class script files, 38 or 38', a number of install class parameters files, 40 or 40', and a number of post-install class script files, 42 or 42'. The pre-install class script files, 38 or 38', and the post-install class script files, 42 or 42' are executable files.

In the presently preferred embodiment, the local collection of installation files 34 is the defaulted collection, whereas the remote collection of installation files 34' is the customized collection. While having a local collection of installation files 34 is preferred, it will be appreciated that the present invention may nevertheless be practiced without it. Additionally, while for ease of understanding, the present invention is being described with the defaulted/customized collection of installation files, 34 or 34', being located on local/remote storage devices, 24 or 24', it will be appreciated that the defaulted/customized collection of installation files, 34 or 34', may be located on the local/remote install media, 22 or 22', respectively. In fact, under the presently preferred embodiment, the defaulted collection of installation files 34 is located on the local install media 22. Similarly, while the present invention is being described with the local install module 32 being located on the install media 22, it will be appreciated that the local install module 32 may be located on the boot device 20. Furthermore, while the present invention is being described with the pre-install and post-install class script files, 38 or 38' and 42 or 42', as executable files, it will be appreciated that the present invention may be practiced with non-executable pre-install and post-install class script files having tokens that can cause equivalent functions to be accomplished.

Continuing to refer to FIG. 2, the install media locator and starter module 28 is loaded into the memory of the computer system and given control as part of the computer system's boot up process. The install media locator and starter module 28 is used to locate a local or a remote media, 22 or 22', and starts up the local/remote install set up and control module, 30 or 30', on the local/remote media, 22 or 22'. The local/remote install set up and control module, 30 or 30', is used to determine at least a pre-install class or an install class or a post-install class for the computer system. The local/remote install set up and control module, 30 or 30', makes the class determinations based on the classification rules stored in the defaulted/customized classification rules file, 36 or 36'. Additionally, the local/remote install set up and control module, 30 or 30', is used to start the corresponding defaulted/customized pre-install class script file, 38 or 38', if a pre-install class is determined, the local/remote install module, 32 or 32', if an install class is determined, and the corresponding defaulted/customized post-install class script file, 42 or 42', if a post-install class is determined. The local/remote install module, 32 or 32', is used to install software products and configure the operating environment of the computer system. The local/remote install module, 32 or 32', installs the software products and configure the operating environment based on the installation parameters stored in the corresponding defaulted/customized install class parameters file, 40 or 40', of the determined installation class. The defaulted/customized pre-install class and post-install class script files, 38 or 38', and, 42 or 42', are used to perform preinstallation and post-installation tasks respectively.

While the defaulted/customized pre-install class and post-install class script files, 38 or 38', and, 42 or 42', are typically used to perform preinstallation and post-installation tasks, and the local/remote install module, 32 or 32', is used to install the software products and configure the operating environment, it will be appreciated that the present invention may be practiced with either the pre-install class script file, 38 or 38', or the post-install class script file, 42 or 42', performing the automatic install and configuration, without involving the install module, 32 or 32', at all. That's why a computer system may have as little as only one classification determined by the automatic install set up and control module, 30 or 30', and the pre-install class script file, 38 or 38', the install module, 32 and 32', and the post-install script file, 42 or 42', are invoked only if corresponding pre-install, install, and post-install classes are determined.

In the presently preferred embodiment, the local/remote install module, 33 or 32', is also used to heuristically determine a number of critical install parameters, if they are not specified in the corresponding defaulted/customized install class parameters file, 40 or 40', of the determined installation class. For example, if the swap size is not specified, the swap size for a stand alone system is set to be one multiple of the memory of the system, whereas, the swap size for a server is set to be another multiple of the memory of the system. In either case, the swap size must also exceeds certain predetermined minimum, but at the same time not greater than certain predetermined maximum. It will be appreciated that what constitutes critical install parameters and the manner they should be heuristically determined are application dependent.

Additionally, in the presently preferred embodiment, the defaulted/customized install class parameter file, 40 or 40', for an install class may be dynamically derived by a defaulted/customized pre-install class script file, 38 or 38'. The local/remote install set up and control module, 30 or 30', determines whether the defaulted/customized install class parameter file, 40 or 40', for an install class is to be dynamically derived or not, and the defaulted/customized pre-install class script file, 38 or 38', that will do the derivation, based on the rules in the defaulted/customized classification rules file, 36 or 36'. The local/remote install set up and control module, 30 or 30', also controls the naming of the derived install class parameters file, 40 or 40'.

Except for the manner, the local/remote install module, 32 or 32', cooperates with the other elements, and the application dependent manner for heuristically determining critical install parameters, the local/remote install module, 32 or 32', is intended to represent a broad category of install procedures found in many computer systems. Its constitutions and basic functions are well known, and therefore will not be otherwise described in further detail. Each of the other elements, 28, 30 and 30', 34–42, and 34'–42', and the manner they cooperate with one another, will be described in further detail below with references to the remaining figures.

Figure 3:
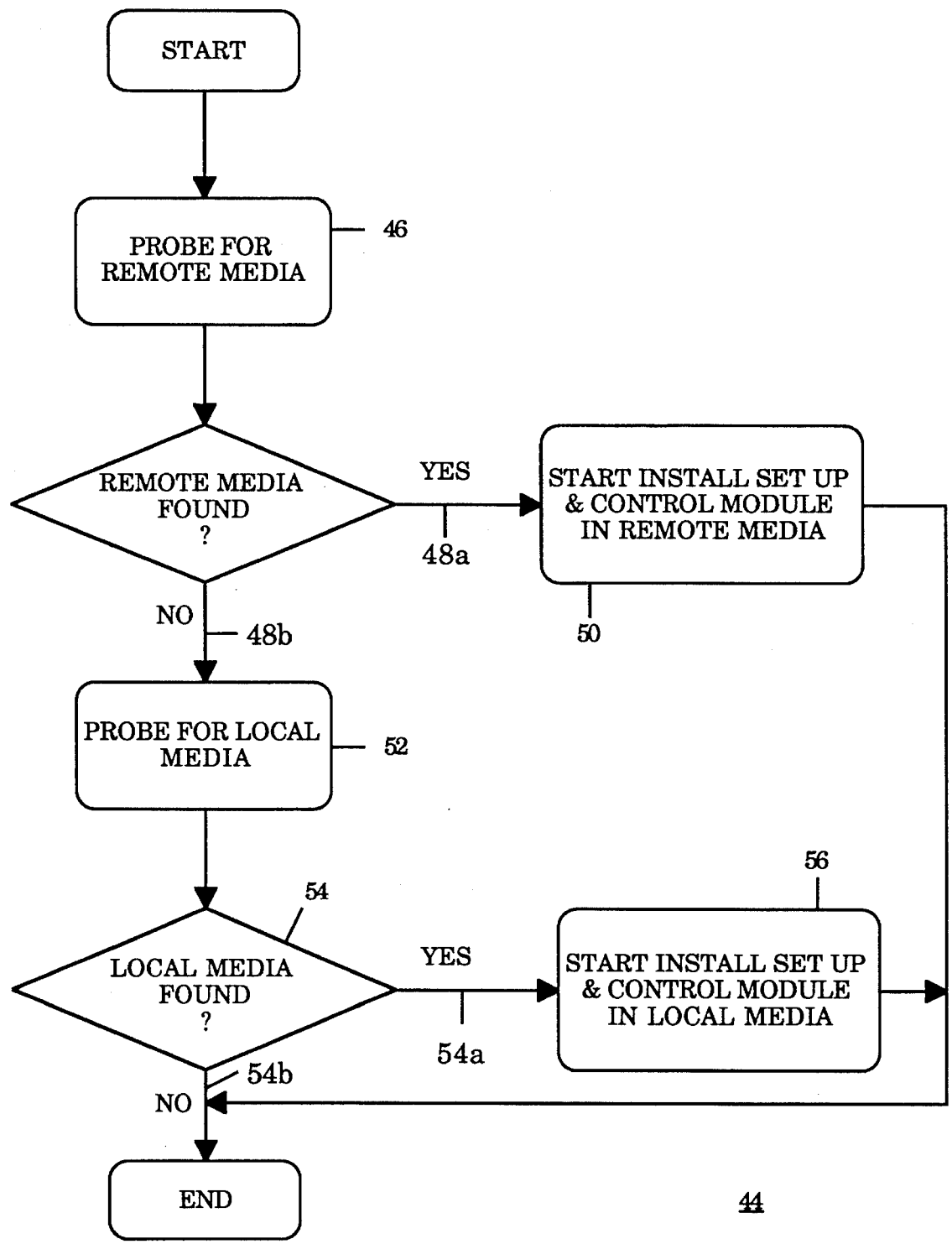
FIG. 3 illustrates the operation flow of the install media locator and starter module of the present invention.

Referring now to FIGS. 3, a block diagram illustrating the preferred operation flow of the install media locator and starter module is shown. Upon given control, the install media locator and starter module probes for remote install media available through the network, block 46. If a remote install media is located through the network, branch 48a, the install media locator and starter module starts up and transfers control to the install set up and control module in the remote media, block 50. On the other hand, if a remote install media is not located through the network, branch 48b, the install media locator and starter module probes for locally available install media, block 52. If a local install media is located, branch 54a, the install media locator and starter module starts up and transfers control to the install set up and control module in the local install media, block 56. If a local install media is also not found, branch 54b, the install media locator and starter module terminates, preferably with error messages describing the problem and suggesting corrective actions. It will be appreciated that the present invention may be practiced with the install media locator and starter module probing for a local install media first.

Additionally, in either case, block 50 or 56, the install media locator and starter module informs the located remote/local install set up and control module that it is being started by an install media locator and starter module. Furthermore, the install media locator and starter module provides its own location to the located remote/local install set up and control module.

Figure 4:
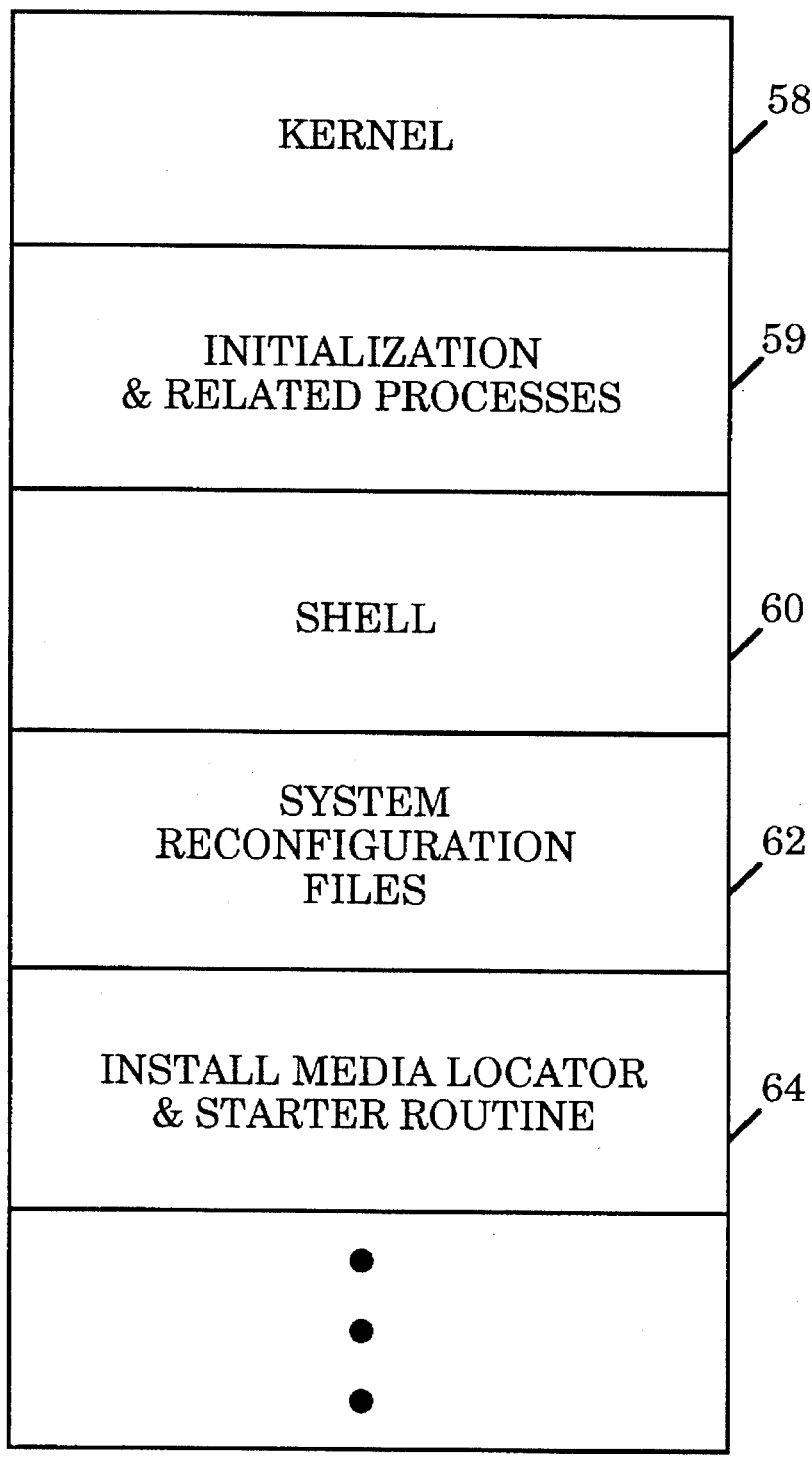
FIG. 4 illustrates one embodiment of the install media locator and starter module of the present invention.

Referring now to FIG. 4, a block diagram illustrating one embodiment of the install media locator and starter module is shown. In this embodiment, the install media locator and starter module 28 comprises a UNIX® kernel 58 (UNIX is a registered trademark of UNIX System Laboratories), a number of initialization related programs 59, a UNIX® Shell program 60, a set of UNIX® system reconfiguration files 62, and an install media locator and starter routine 64 implemented in Shell having probing and starting logic as described in FIG. 3. In this embodiment, the kernel 58 is first loaded into memory and given control, when the computer system is booted. The kernel then starts the initialization and related processes 59, which in turn execute the system reconfiguration files 62. After sufficient system start up and reconfiguration processing has been performed to support the install media locator and starter routine 64, the system reconfiguration files 62 start the install media and locator and starter routine 64.

Under this embodiment, the local and remote install media are identified with predetermined means appropriate for the media. For local install media, such as a CDROM, the identifier comprises a predetermined character string in the machine readable media label. For remote media, the identifier is an entry in the "bootparams" database accessed via a program designed to use that protocol. The install media locator and starter routine 64 assumes the located remote/local install media is a bootable media, and starts the located remote/local install set up and control module by rebooting the located remote/local install media. The install media locator and starter routine 64 further assumes that the located remote/local install set up and control module may also be used for other purposes, such as manual installs or maintenance, and provides the located remote/local install set up and control module with a predetermined character string, such as "FD=<boot device>" or "install", to inform the remote/local install set up and control module of the fact that it is being started by an install media locator and starter module 64 for the purpose of performing an auto install and operating environment configuration. The predetermined character strings are provided as part of the reboot arguments.

In addition, since the boot device comprising the install media locator and starter module 28 is often assumed to be the main system disk where the operating system software is to be installed, it is convenient and useful for the located remote/local install set up and control module to be informed of which disk the install media locator and starter module was located on. Thus, the install media locator and starter routine 64 also provides the located remote/local install set up and control module with the major and minor number of the boot device comprising the install media locator and starter module 28, as part of the reboot arguments.

Figure 5:
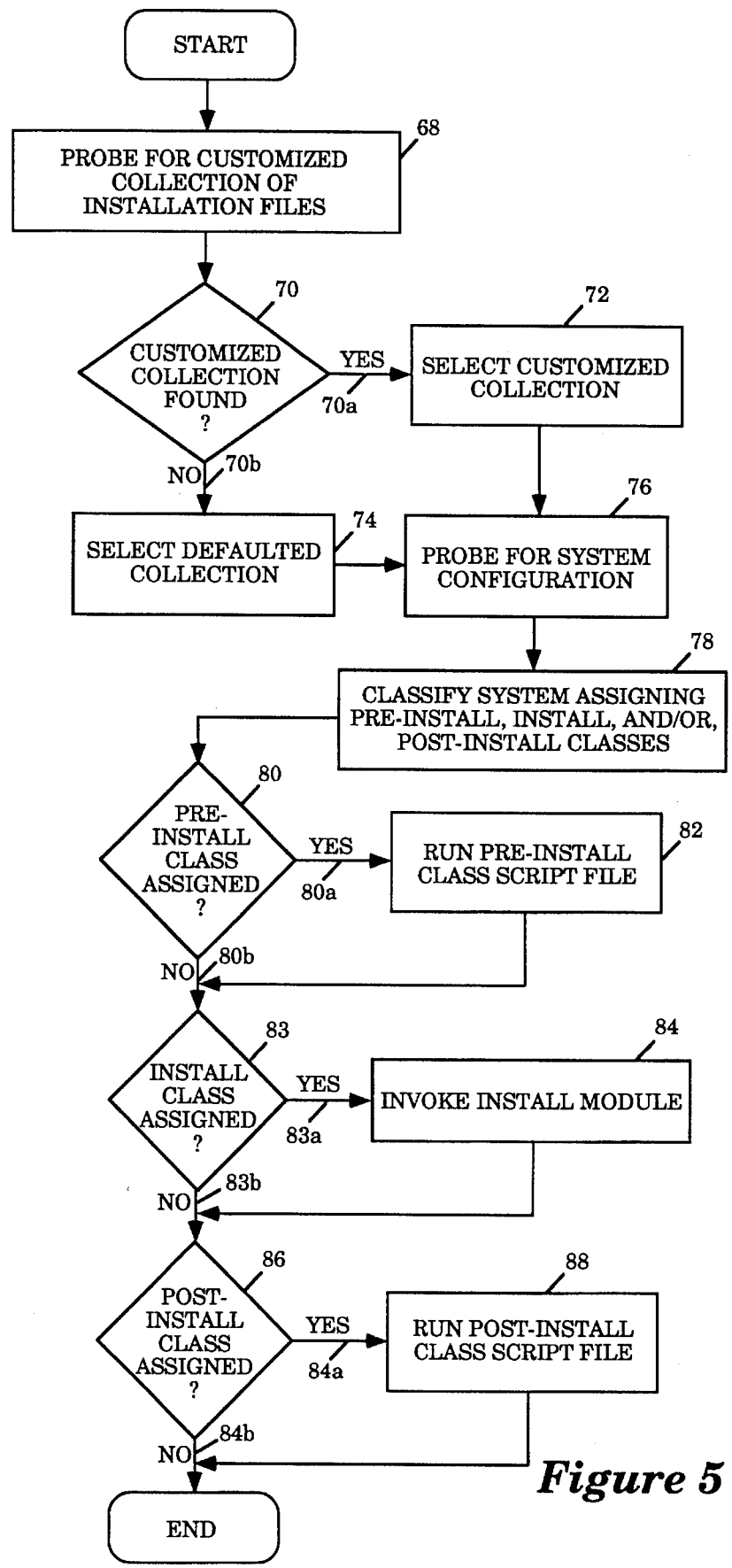
FIG. 5 illustrates the operation flow of the local/remote install set up and control module of the present invention.

Referring now to FIG. 5, a block diagram illustrating the operating flow of the local/remote install set up and control module is shown. Upon given control, the local/remote install set up and control module probes for customized collection of installation files, block 68. If a customized collection of installation files is found, branch 70a, the local/remote install set up and control module selects the located customized collection of installation files. Otherwise, the local/remote install set up and control module selects the defaulted collection of installation file, block 74.

Upon selecting either the defaulted or customized collection of installation files, the install set up and control module probes for system configuration information, block 76. The install set up and control module then classifies the computer system, assigning at least a pre-install class, an install class, or a post-install class, based on the system configuration information received, and using the classification rules in the classification rules file in the selected collection of installation files, block 78. Additionally, if the computer system is to be assigned an install class, and the corresponding install class parameters file is to be dynamically derived by a pre-install class script file, the install set up and control module names the install class arbitrarily. A computer system with an arbitrarily named install class having a dynamically derived install class parameters file, by definition, always has a pre-install class.

If a pre-install class is assigned, branch 80a, the install set up and control module then starts the corresponding pre-install class script file in the selected collection of installation files, block 82. If the pre-install class script file is to derive an install class parameter file, the install set up and control module provides the pre-install class script file with the name of the assigned install class. If no pre-install class is assigned or upon returning from the pre-install class script file, the install set up and control module determines if an install class is assigned, block 83.

If a pre-install class is assigned, branch 83a, the install set up and control module then starts the install module providing it with the name of the assigned install class, block 84. As described earlier, the install module installs software products and configures the operating environment of the computer system in accordance to the corresponding (derived) defaulted/customized install class parameters file of the determined install class, heuristically determining the unspecified critical install parameters if necessary. If no install class is assigned or upon returning from the install module, the install set up and control module determines if a post-install class is assigned, block 86.

If a post-install class is assigned, branch 86a, the install set up and control module then starts the corresponding post-install class script file of the post-install class determined. If no post-install class is assigned, branch 84b, or upon returning from the started post-install class script file, the install set up and control module terminates.

Figure 6:
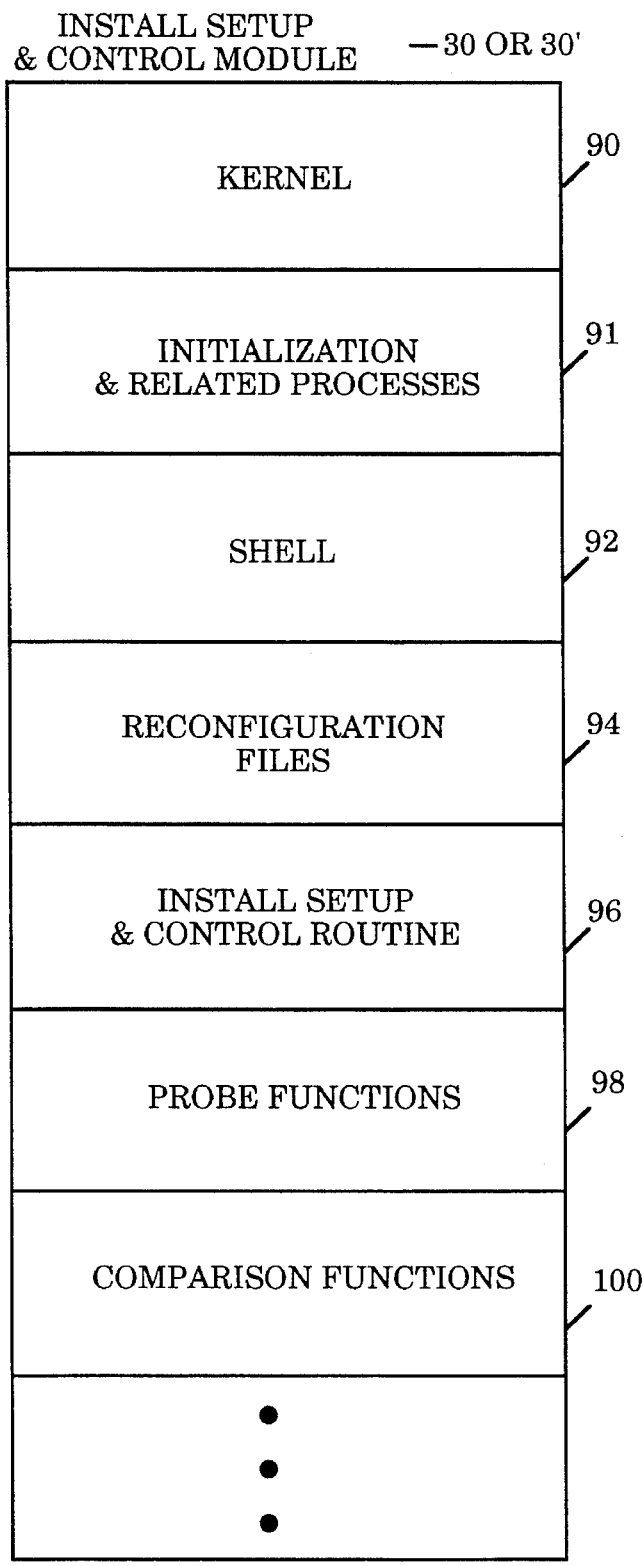
FIG. 6 illustrates one embodiment of the local/remote install set up and control module of the present invention.

Referring now to FIGS. 6 and 7, two block diagrams illustrating one embodiment of the local/remote install set up and control module is shown. In this embodiment, the local/remote install set up and control module, 30 or 30', comprises a UNIX® kernel 90, a number of initialization related programs 91, a UNIX® Shell program 92, a set of UNIX® reconfiguration files 94, an install set up and control routine 96 implemented in Shell having probing and starting logic as described in FIG. 5, a number of probe functions 98, and a number of comparison functions 100. The results of the probe functions 98 are saved in environment variables. A number of exemplary probe functions 98, and their corresponding environment variables 102, and comparison functions 100 are shown in FIG. 7.

Still referring to FIG. 6, as described earlier, the local/remote install set up and control module, 30 or 30', is started by the install media locator and starter module by rebooting the computer system off the located local/remote install media. The kernel 90 is loaded into memory and given control, when the computer system is rebooted off the located local/remote install media. The kernel 90 then starts the initialization and related processes 91, which in turn starts the reconfiguration files 94. After sufficient system start up and reconfiguration processing has been performed to support the install set up and control routine 96, the reconfiguration files 94 start the install set up and control routine 96. The install set up and control routine then assigns at least a preinstall class, or an install class, or a post-installed class, as described earlier, using the probe and comparison functions, 98 and 100. Upon determining the various classes, the install set up and control routine 96 then selectively invokes the defaulted/customized pre-install class script file, the install module, and the defaulted/customized post-install class script files.

Referring now to FIGS. 8–12, four block diagrams illustrating an exemplary classification rules file, an exemplary pre-install class script file, an exemplary install class parameters file, and an exemplary post-install class script file are shown. FIG. 8 illustrates an exemplary classification rules file, 36 or 36', comprising a number of exemplary rules, 104a–104g. Each exemplary rule, 104a, . . ., or 104g, comprises a number of configuration characteristics matching criteria, and at least one exemplary pre-install class, or an exemplary install class, or an exemplary post-install class. For this exemplary classification rules file, 36 or 36', the pre-install, install, and post-install classes are specified in order at the end of a rule, 104a–104g. Additionally, the character '–' denotes that the computer system with the matching configuration characteristics does not have a pre-install, install, or post-install class, and the character '=', used only for install class, denotes that the install class parameters file is to be derived by the preinstall class script file for the computer system with the matching configuration characteristics. For examples, the character '–' before the exemplary install classes "class_2×104", "class_1×207_t3", and "class_104_207" in exemplary rules 104a–104c denotes that computer systems matching the criteria of any one of these rules do not have pre-install classes, and the character '=' after the exemplary pre-install classes "derive_class2×104", "derive_class_1×207", "derive_class_104_207", and "derive_class_104_207" in exemplary rules 104d–104g denotes that computer systems matching the criteria of any one of these rules are to have their install class parameters files derived.

FIG. 9 illustrates an exemplary pre-install class script file, 38 or 38', comprising a number of exemplary statements for performing various exemplary pre-installation tasks. In particular, the exemplary pre-install class script file, 38 or 38', comprises a number of exemplary statements 106 for performing exemplary "German" and "French" localizations for the operating system and windows to be installed. FIG. 10 illustrates an exemplary install class parameters file, 40 or 40', comprising a number of exemplary install parameters for the exemplary install class, such as "System_Type" being "Standalone", "Clusters" to be assigned being "SUN-WCreq" and "SUNWCadm", and "Packages" to be installed being "SUNWesu", "SUNWhea", and "SUNWinst". Lastly, FIG. 11 illustrates an exemplary post-install class script file, 42 or 42', comprising a number of exemplary statements for performing various exemplary post-installation tasks. In particular, the exemplary post-install class script file, 42 or 42', comprises a number of exemplary statements 108 for reestablishing the search path to the compilers.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a computer system, a computer implemented method for automatically installing a plurality of software products on said computer system and configuring said computer system's operating environment, said method comprising the steps of:

a) booting said computer system, loading a first install control module for locating install media and starting installation from a boot device into said computer system's memory, and transferring control to said first install control module loaded into said memory;

b) said first install control module locating an install media comprising a second install control module for setting up and controlling automatic installation, and giving execution control to said second install control module;

c) said second control module locating a collection of installation files comprising a classification rules file and a plurality of install script files, said classification rules file having a plurality of classification rules for classifying a computer system, each of said install script file having a plurality of install commands for performing certain installation and/or configuration tasks;

d) said second install control module determining at least one classification for said computer system using said located classification rules file; and e) said second install control module installing said plurality of software products on said computer system, and configuring said computer system's operating environment automatically by selectively executing said install script files based on the classification determined for said computer system, wherein said first install control module comprises an operating system with minimal functions, a plurality of initialization and related processes, a command-like language interpreter, a set of system reconfiguration files, and an install media locator and starter routine;

said step a) comprises the steps of:

a.1) booting said computer system, loading said operating system into said memory, and transferring control to said operating system loaded into said memory;

a.2) said operating system loading said initialization and related processes and said command-like language interpreter into memory, and starting execution of said initialization and related processes:

a.3) said operating system further loading said system reconfiguration files into said memory and starting execution of said system reconfiguration files using said command-like language interpreter; end a.4) said operating system further loading said install media locator and starter routine into said memory and starting execution of said install media locator and starter routine using said command-like language interpreter.

2. The method as set forth in claim 1, wherein, said located second install control module in said step b) comprises an operating system with minimal functions, a plurality of initialization and related processes, a command-like language interpreter, a set of reconfiguration files, an automatic install set up and control routine, a plurality of probe functions, and a plurality of compare functions;

said control transfer in said step b) is achieved by said second install control module being loaded into said memory, and giving execution control to said second install control module loaded into said memory.

3. The method as set forth in claim 1, wherein, said install media located in said step b) is either i) a local install media of said computer system or ii) a remote install media coupled to said computer system through a network; and said collection of installation files located in said step c) is either i) a defaulted collection of installation files or ii) a customized collection of installation files, said defaulted collection of installation files being stored on either i) local storage means of said computer system or ii) a local install media coupled said computer system, said customized collection of installation files being stored in either i) remote storage means coupled to said computer system through a network, or ii) a remote install media coupled to said computer system through a network.

4. The method as set forth in claim 1, wherein, said install script files located in said step c) comprises a plurality of pre-install script files corresponding to a plurality of pre-install classes of computer systems for performing pre-installation tasks for computer systems of the corresponding pre-install classes;

said at least one classification determined in said step d) comprises a pre-install class of said computer system; and said step e) comprises said second control module executing the pre-install script file corresponding to said determined pre-install class.

5. The method as set forth in claim 4, wherein, said at least one classification determined in said step d) further comprises an install class of said computer system;

said pre-installation tasks performed by said pre-install script file corresponding to said determined pre-install class comprise deriving an install class parameters file for said install class of said computer system;

one of said boot device and said located install media in said step b) further comprises a local/remote install module;

said step e) further comprises said second install control module executing said local/remote install module using said derived install parameters file.

6. The method as set forth in claim 4, wherein, said pre-installation tasks performed by said pre-install script file corresponding to said determined pre-install class of said computer system comprise localization of said automatic installation and configuration to be performed in said step e) to a local language.

7. The method as set forth in claim 1, wherein, one of said boot device and said install media located in said step b) further comprises a local/remote install module;

said collection of installation files located in said step c) further comprises a plurality of install class parameters files corresponding to a plurality of install classes of computer systems;

said at least one classification determined in said step d) comprises an install class of said computer system; and said step e) comprises said second install control module executing said install module using the install class parameters file corresponding to said determined install class of said computer system.

8. The method as set forth in claim 7, wherein, said local/remote install module in said step e) determines critical install parameters unspecified in said install class parameters file corresponding to said determined install class.

9. The method as set forth in claim 1, wherein, said collection of installation files located in said step c) further comprises a plurality of post-install script files corresponding to a plurality of post-install classes of computer systems;

said at least one classification determined in said step d) comprises a post-install class of said computer system; and said step e) comprises said second control module executing the post-install script file corresponding to said determined post-install class of said computer system.

10. In a computer system, an apparatus for automatically installing a plurality of software products on said computer system and configuring said computer system's operating environment, said apparatus comprising:

a) booting means coupled to said computer system's processor and memory for loading a first install control module into said memory, and giving execution control to said first install control module loaded into said memory, said first install control module being used for locating install media and starting installation;

b) install media coupled to said computer system's processor and memory comprising a second install control module for setting up and controlling automatic installation, said second install control module being loaded into said memory and given execution control by said first install control module booted into said memory upon locating said install media; and c) file subsystem means coupled to said computer system's processor and memory for storing a collection of installation files comprising a classification rules file and a plurality of install script files, said classification rule file having a plurality of classification rules for classifying a computer system, said install script files being organized by computer system classifications, each of said install script files having a plurality of install commands for performing certain installation and configuration tasks, said classification file being used to determine at least one classification for said computer system by said second install control module loaded in said memory upon locating said file subsystem;

said second install control module automatically causing said plurality of software products to be installed on said computer system and said computer system's operating environment to be configured by selectively executing said install script files based on the classification determined for said computer system under its control, wherein, said first install control module comprises an operating system with minimal functions, a plurality of initialization and related processes, a command-like language interpreter, a set of system reconfiguration files, and an install media locator and starter routine;

said booting means boots said install media locator and starter module into said memory and gives it control by booting said operating system into said memory, and giving control to said operating system booted into said memory, loading said initialization and related processes into said memory and executing said loaded initialization and related processes under the control of said operating system, loading said system reconfiguration files into said memory and executing said loaded system reconfiguration files under the control of said operating system and said command-like language interpreter, and loading said install media locator and starter routine into said memory and executing said loaded install media locator and starter routine under the control of said operating system and said command-like language interpreter.

11. The apparatus as set forth in claim 10, wherein, said located second install control module comprises an operating system with minimal functions, a plurality of initialization and related processes, a command-like language interpreter, a set of reconfiguration files, an automatic install set up and control routine, a plurality of probe functions, and a plurality of compare functions;

said control transfer to said located second install control module is achieved by rebooting said second install control module into said memory, and giving execution control to said second install control module booted into said memory.

12. The apparatus as set forth in claim 10, wherein, said install media is either i) a local install media of said computer system or ii) a remote install media coupled to said computer system through a network; and said collection of installation files stored in said file subsystem means is either i) a defaulted collection of installation files, or ii) a customized collection of installation files, said file subsystem means storing said defaulted collection of installation files being either i) local storage means of said computer system, or ii) a local install media coupled said computer system, said file subsystem means storing said customized collection of installation files being either i) remote storage means coupled said computer system through a network, or ii) a remote install media coupled to said computer system through a network.

13. The apparatus as set forth in claim 10, wherein, said install script files stored in said file subsystem means comprises a plurality of pre-install script files corresponding to a plurality of pre-install classes of computer systems for performing pre-installation tasks for computer systems of the corresponding pre-install classes;

said at least one classification determined comprises a pre-install class [for] of said computer system; and said automatic installation and configuration caused by said second install control module comprises executing the pre-install script file corresponding to said determined pre-install class of said computer system under its control.

14. The apparatus as set forth in claim 13, wherein, said at least one classification determined further comprises an install class of said computer system;

said pre-installation tasks performed by said pre-install script file corresponding to said determined pre-install class of said computer system comprise deriving an install class parameters file for said install class of said computer system;

one of said boot device and said located install media in said step b) further comprises a local/remote install module;

said automatic installation and configuration caused by said second install control module comprises executing said local/remote install module using said derived install parameters file under its control.

15. The apparatus as set forth in claim 13, wherein, said pre-installation tasks performed by said pre-install script file corresponding to said determined pre-install class of said computer system comprise localizing said automatic installation and configuration to a local language.

16. The apparatus as set forth in claim 10, wherein, either said boot device or said install media further comprises a local/remote install module;

said collection of installation files further comprises a plurality of install class parameters files corresponding to a plurality of install classes of computer systems;

said at least one classification determined comprises an install class of said computer system; and said automatic installation and configuration caused by said second install control module comprises executing said install module using the install class parameters file corresponding to said determined install class of said computer system under its control.

17. The apparatus as set forth in claim 16, wherein, said local/remote install module determines critical install parameters unspecified in said install class parameter file corresponding to said determined install class.

18. The apparatus as set forth in claim 10, wherein, said collection of installation files stored in said file subsystem means further comprises a plurality of post-install script files corresponding to a plurality of post-install classes of computer systems;

said at least one classification determined comprises a post-install class of said computer system; and said automatic installation and configuration caused by said second install control module comprises executing the post-install script file corresponding to said determined post-install class of said computer system under its control.

19. In a computer system, a computer implemented method for automatically installing a plurality of software products on said computer system and configuring said computer system's operating environment, said method comprising the steps of:

a) booting said computer system, loading a first install control module for locating install media and starting installation from a boot device into said computer system's memory, and transferring control to said first install control module loaded into said memory;

b) said first install control module locating an install media comprising a second install control module for setting up and controlling automatic installation, and giving execution control to said second install control module;

c) said second control module locating a collection of installation files comprising a classification rules file and a plurality of install script files, said classification rules file having a plurality of classification rules for classifying a computer system, each of said install script file having a plurality of install commands for performing certain installation and/or configuration tasks;

d) said second install control module determining at least one classification for said computer system using said located classification rules file; and e) said second install control module installing said plurality of software products on said computer system, and configuring said computer system's operating environment automatically by selectively executing said install script files based on the classification determined for said computer system, wherein said software products include application programs and operating system programs.

20. In a computer system, an apparatus for automatically installing a plurality of software products on said computer system and configuring said computer system's operating environment, said apparatus comprising:

a) booting means coupled to said computer system's processor and memory for loading a first install control module into said memory, and giving execution control to said first install control module loaded into said memory, said first install control module being used for locating install media and starting installation;

b) install media coupled to said computer system's processor and memory comprising a second install control module for setting up and controlling automatic installation, said second install control module being loaded into said memory and given execution control by said first install control module booted into said memory upon locating said install media; and c) file subsystem means coupled to said computer system's processor and memory for storing a collection of installation files comprising a classification rules file and a plurality of install script files, said classification rule file having a plurality of classification rules for classifying a computer system, said install script files being organized by computer system classifications, each of said install script files having a plurality of install commands for performing certain installation and configuration tasks, said classification file being used to determine at least one classification for said computer system by said second install control module loaded in said memory upon locating said file subsystem;

said second install control module automatically causing said plurality of software products to be installed on said computer system and said computer system's operating environment to be configured by selectively executing said install script files based on the classification determined for said computer system under its control, wherein said software products include application programs and operating system programs.

* * * * *

UNITED STATES PATENT AND TRADEMARK OFFICE
CERTIFICATE OF CORRECTION

PATENT NO. : 5,555,416
DATED : September 10, 1996
INVENTOR(S) : Owens et al.

It is certified that error appears in the above-identified patent and that said Letters Patent is hereby corrected as shown below:

Title page,
Item [21], please delete Application Number "291,330" and insert -- 08/291,330 --.

Item [63], Related U.S. Application Data,
Please delete Ser. No. "949,041" and insert -- 07/949,041 --.

Column 14,
Line 4, please delete "[for]" after "class".

Signed and Sealed this

Twenty-sixth Day of February, 2002

Attest:

Attesting Officer

JAMES E. ROGAN
Director of the United States Patent and Trademark Office